US012578205B2

(12) United States Patent
Huberman et al.

(10) Patent No.: US 12,578,205 B2
(45) Date of Patent: Mar. 17, 2026

(54) METHOD AND SYSTEM FOR AUTOMATICALLY GENERATING A MAP OF AN INDOOR SPACE

(71) Applicant: Mapsted Corp, Oakville (CA)

(72) Inventors: Sean Huberman, Guelph (CA);
Jianfeng Hu, Mississauga (CA);
Ahmed Mahmood, Milton (CA)

(73) Assignee: Mapsted Corp., Oakville (CA)

( * ) Notice: Subject to any disclaimer, the term of this patent is extended or adjusted under 35 U.S.C. 154(b) by 157 days.

(21) Appl. No.: 17/728,018

(22) Filed: Apr. 25, 2022

(65) Prior Publication Data
US 2023/0341241 A1 Oct. 26, 2023

(51) Int. Cl.
| | |
|---|---|
| *G01C 21/00* | (2006.01) |
| *G06T 11/00* | (2006.01) |
| *G06V 10/25* | (2022.01) |
| *G06V 10/44* | (2022.01) |
| *G06V 10/764* | (2022.01) |
| *G06V 10/774* | (2022.01) |
| *G06V 30/422* | (2022.01) |

(52) U.S. Cl.
CPC ....... *G01C 21/383* (2020.08); *G01C 21/3867* (2020.08); *G06T 11/00* (2013.01); *G06V 10/25* (2022.01); *G06V 10/44* (2022.01); *G06V 10/764* (2022.01); *G06V 10/774* (2022.01); *G06V 30/422* (2022.01)

(58) Field of Classification Search
CPC G01C 21/383; G01C 21/3867; G01C 21/206; G06T 11/00; G06V 10/25; G06V 10/44; G06V 10/764; G06V 10/774; G06V 30/422
See application file for complete search history.

(56) References Cited

U.S. PATENT DOCUMENTS

| | | | | |
|---|---|---|---|---|
| 10,997,325 B2 * | 5/2021 | Austern | | G06V 10/235 |
| 11,481,925 B1 * | 10/2022 | Li | | H04N 23/698 |
| 2015/0153180 A1 * | 6/2015 | Ettinger | | G01C 21/206 |
| | | | | 701/410 |
| 2015/0363647 A1 * | 12/2015 | Perez | | G06V 20/20 |
| | | | | 345/633 |
| 2019/0392254 A1 * | 12/2019 | Oh | | G06N 7/01 |
| 2020/0050995 A1 * | 2/2020 | Ramanand | | G06Q 10/1097 |
| 2021/0207974 A1 * | 7/2021 | Zhou | | G06V 20/647 |
| 2021/0406710 A1 * | 12/2021 | Begleiter | | G06N 20/20 |
| 2022/0180595 A1 * | 6/2022 | Bethi | | G06N 20/20 |
| 2022/0269885 A1 * | 8/2022 | Wixson | | G06N 3/08 |

* cited by examiner

*Primary Examiner* — Keith D Bloomquist
(74) *Attorney, Agent, or Firm* — Harshdeep Chawla

(57) ABSTRACT

Examples of generating a map for an indoor space are described. In one example, a raw digital representation of the indoor space is obtained and preprocessed by at least one of marking a region-of-interest (ROI) in the raw digital representation and classifying the indoor space into a space-category to obtain a preprocessed representation. Using the preprocessed representation, a skeletal map is generated including indicators to identify elements of the indoor space. Revision inputs are received to modify an erroneous indicator from amongst the multiple indicators. The erroneous indicator is revised to a modified indicator and the modified indicator and unmodified indicators are used to create a modified skeletal map which is usable for localizing a mobile device in the indoor space.

20 Claims, 3 Drawing Sheets

300

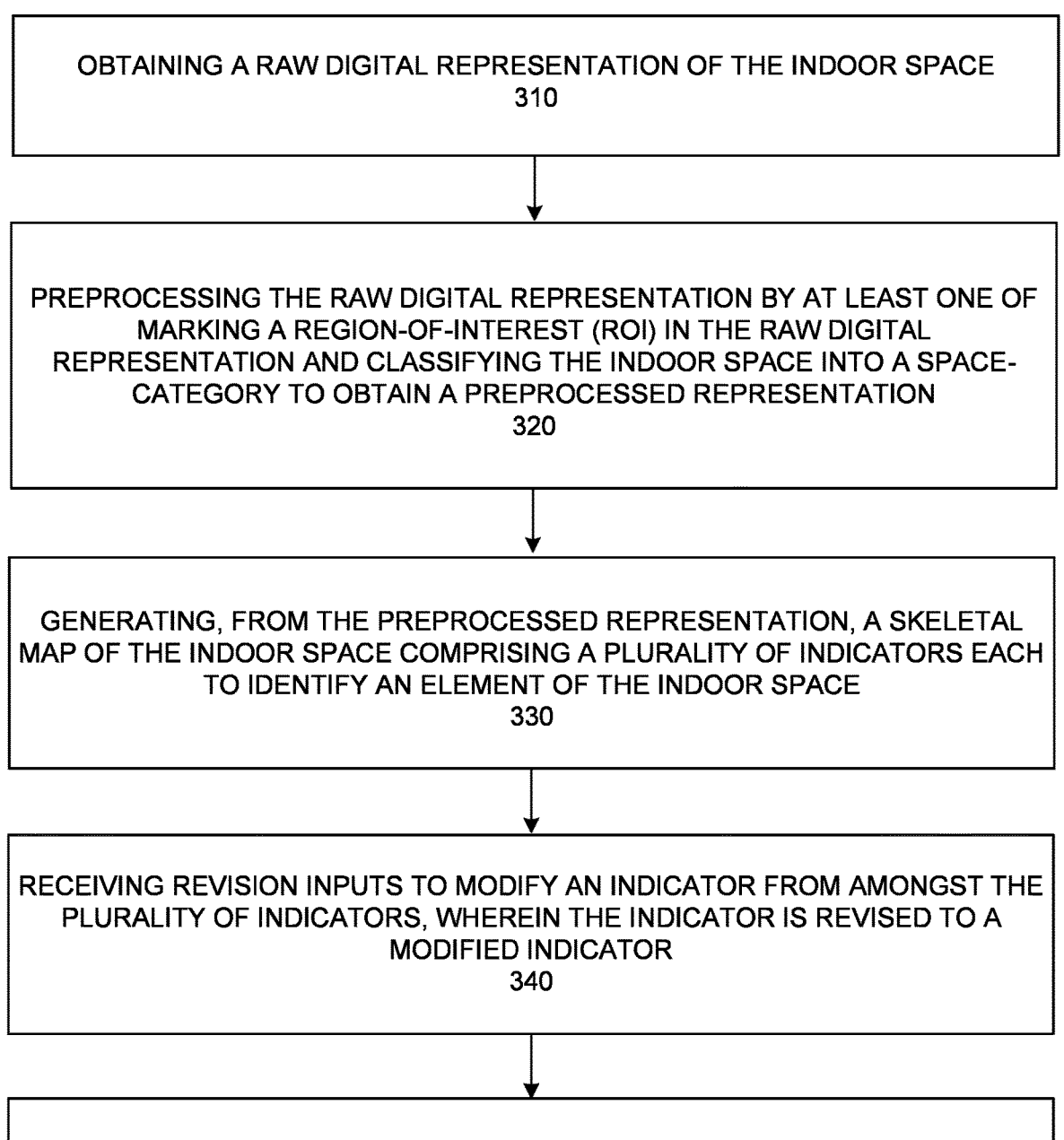

OBTAINING A RAW DIGITAL REPRESENTATION OF THE INDOOR SPACE
310

PREPROCESSING THE RAW DIGITAL REPRESENTATION BY AT LEAST ONE OF
MARKING A REGION-OF-INTEREST (ROI) IN THE RAW DIGITAL
REPRESENTATION AND CLASSIFYING THE INDOOR SPACE INTO A SPACE-
CATEGORY TO OBTAIN A PREPROCESSED REPRESENTATION
320

GENERATING, FROM THE PREPROCESSED REPRESENTATION, A SKELETAL
MAP OF THE INDOOR SPACE COMPRISING A PLURALITY OF INDICATORS EACH
TO IDENTIFY AN ELEMENT OF THE INDOOR SPACE
330

RECEIVING REVISION INPUTS TO MODIFY AN INDICATOR FROM AMONGST THE
PLURALITY OF INDICATORS, WHEREIN THE INDICATOR IS REVISED TO A
MODIFIED INDICATOR
340

CREATING A MODIFIED SKELETAL MAP OF THE INDOOR SPACE COMPRISING
THE MODIFIED INDICATOR AND UNMODIFIED INDICATORS, WHEREIN THE
MODIFIED SKELETAL MAP IS USABLE WITH A LOCALIZATION APPLICATION FOR
LOCALIZING A MOBILE DEVICE IN THE INDOOR SPACE
350

FIG. 3

METHOD AND SYSTEM FOR AUTOMATICALLY GENERATING A MAP OF AN INDOOR SPACE

TECHNICAL FIELD

The disclosure herein relates to the field of mobile device indoor navigation and localization.

BACKGROUND

Users of mobile devices increasingly use and depend upon indoor positioning and navigation applications and features. For instance, large indoor spaces such as within enclosed, or partially enclosed, urban infrastructure and buildings, including hospitals, shopping malls, airports, university campuses and industrial warehouses, attract significant user traffic also seek to host a wide set of services that may be of interest to a user. Such services may often be specifically curated for a user based directly on a location of the mobile device of the user. For this purpose, an indoor location-based service (ILBS) system is able to generate suggestions of services and locations to the user by initiating a quick search in the vicinity of a user's location indicated by the user's mobile device. In few other instances, the ILBS systems may further allow a user to search for services or amenities and pin them as potential points-of-interest (POIs). At the same time, the ILBS systems may even offer efficient routing or navigation, coupled with user-friendly navigation, to reach a user-selected destination.

BRIEF DESCRIPTION OF THE DRAWINGS

FIG. 3 illustrates, as an example, a method for automatically generating a map of an indoor space.

DETAILED DESCRIPTION

Figure 1:
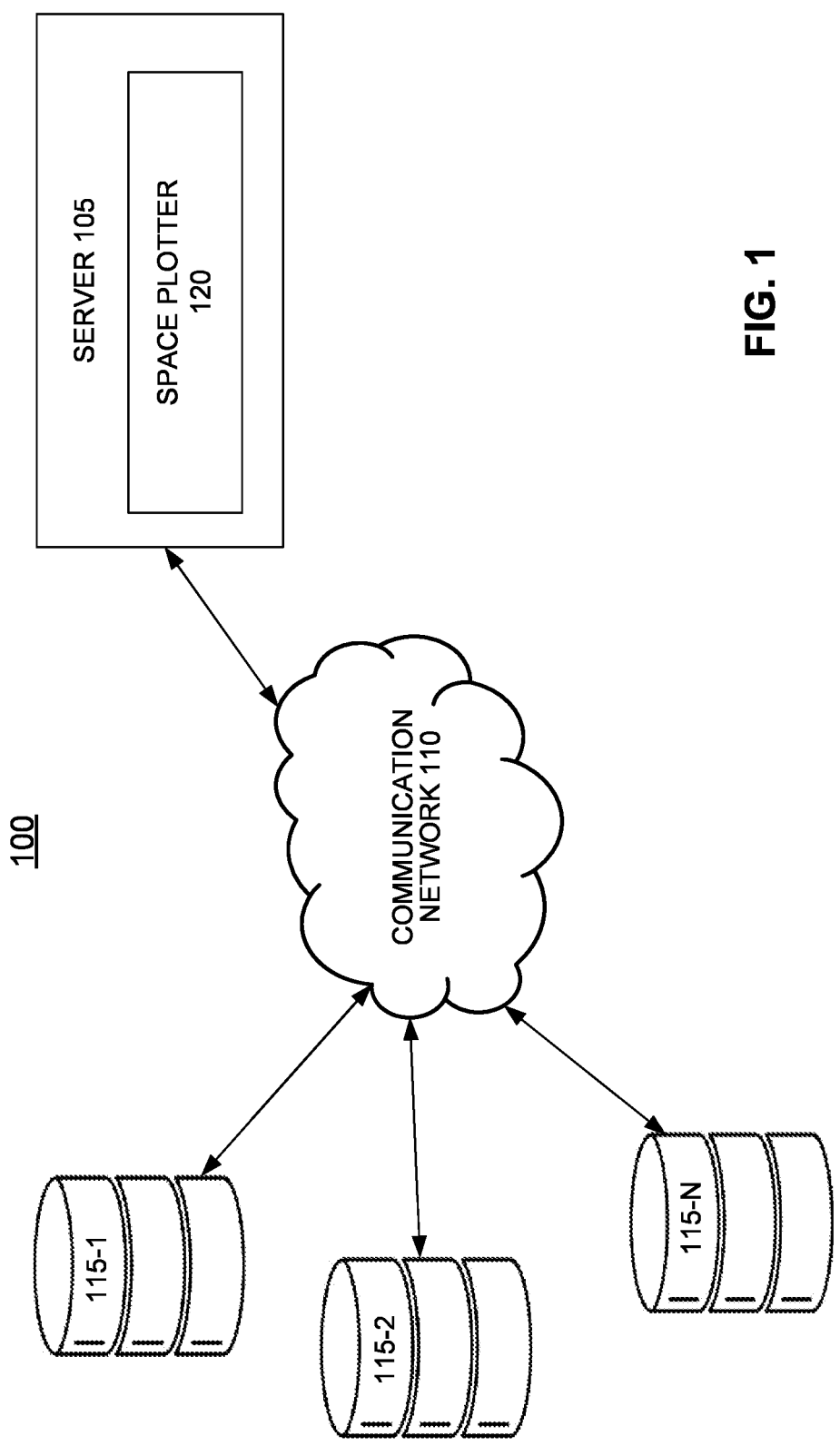
FIG. 1 illustrates, as an example, a network environment for automatically generating a map of an indoor space.

Generally, indoor positioning and navigation of a mobile device carried or worn by a user is achieved using satellite-based navigation systems. However, in indoor spaces, the positioning and navigational capability of the satellite-based navigation system becomes unreliable because the satellite-based navigation technology, generally, relies on the line-of-sight between the mobile device and the satellite. Therefore, when the connection between the two becomes unavailable, or is only sporadically available, such as in indoor spaces, the accuracy of indoor positioning and navigation using the satellite-based navigation technology is adversely affected.

More recently, indoor navigation and positioning solutions may rely on various sensors including accelerometers, gyroscopes, and magnetometers that may be commonly included in mobile phones and other mobile computing devices, in conjunction with acquired wireless communication signal data to localize the mobile device in the indoor space. In other words, recent technological advancements allow the universally available smart mobile devices packing a variety of sensors for gathering data that is usable for positioning allow for extending the usability of indoor positioning systems (IPSs) as well as indoor location-based services (ILBSs). Typically, the IPS uses spatial data generated by such mobile devices in the indoor location to execute efficient and effective localization. The spatial data can be linked to entities in a floor plan, and the entities are, in turn, georeferenced, thereby facilitating localization. In other words, a floor plan representing the indoor space shows the entities which are then linked with the spatial data and georeferenced. Therefore, amongst other things the floor plan and its representation may have a direct bearing on the effectiveness and accuracy of indoor position, which may be of particular relevance if the IPS is to offer time-sensitive services, such as navigation.

Generally, for use for indoor positioning services, various formats of the floor plan of the indoor space are employed. While most floor plans that are presently prepared may follow architectural guidelines or be mapped out via drawing tools, such as a computer-aided design (CAD) tool, even within such a narrow type, there may be substantial variability in the format. For example, in few floor plans, color may be used to denote and demarcate various features, such as rooms, open spaces, doors, aisles, floor openings, escalators, and elevators, while few other floor plans may be black and white or grayscale where, for instance, color codes may be replaced by different patterns. Even with floor plans using color codes, in some instances, color codes may vary between different floor plans prepared, for instance, by different architects. For instance, in one floor plan, green color may be used to indicate rooms, whereas, in another floor plan. In addition, the styles and types of annotations, for instance, arrows, text, icons, language, etc., may also vary across different floor plans. For example, symbols that highlight certain features, such as doors, escalators, elevators, washrooms, and stairs, may not be standard and may be very different across floor plans. As an additional element in the variability in floor plans, different floor plan images may have different resolutions. While few may be well defined and be high resolution, few others may be under-resolved and substantially pixelated.

The conventional approach to generating a map of the indoor space, i.e., to create a machine-usable version of the floor plan which can be used with indoor positioning systems, is to manually create the machine-usable map from the architectural plans. The machine-usable version, in an example, can be a skeletal map of the indoor space depicting only thread-bare entities and features in the indoor space. For instance, for generating the machine-usable map, the drawing of the floor plan may be used and traced or reproduced using drawing tools, such as CAD tools. However, this process is substantially time consuming and labor intensive, and may require considerable skill and understanding in creating the machine-usable map from the floor plan. In other conventional approaches, mechanized conversion of the floor plan in to a machine-usable version may be performed. However, owing to the variations in the different types of floor plans, the map of the indoor space so obtained may be considerably erroneous and, in certain cases, undoable.

Examples of the present subject matter are described herein which seek to address, inter alia, the above outlined deficiencies. Among other benefits and technical effects, embodiments provided herein provide for efficiently and correctly generating a map of an indoor space, for instance, using raw digital information and/or images of the indoor space. In an example, the indoor space can be space enclosed or partially enclosed within a shopping mall, an airport, a warehouse, a campus building, an office space, a stadium, a hospital, a parking lot, a university campus, or any other at least partially enclosed urban infrastructure or building. The present subject matter, basically, is based on a hybridized manner of combining mechanized generation of the map of the floor plan with manual intervention to ensure that the map so generated is accurate and substantially devoid of errors. At the same time, as will be explained later in detail, such a hybrid manner of generating the map allows for a quick and efficient way of creating a machine-usable rendition of the indoor space while without compromising on accuracy.

Embodiments herein provide a technique for generating a map of an indoor space which can then be used for localization of a mobile device in that space. In an example, the technique for generating the map employs a trained machine-learning model, such as a trained deep-learning model. For instance, the machine-learning model may be a Convolutional Neural Network-based (CNN-based) model, a Graph Neural Network-based (GNN-based) model, or a Generative Adversarial Network-based (GAN-based) model.

In particular, the technique may involve, first, obtaining one or more raw digital representations of the indoor space. In an example, the raw digital representation can be a digital drawing or floor plan of the indoor space in a vectored or rasterized format, for instance, prepared by an architect using a drawing tool. As an example, the raw digital representation can be a CAD drawing of the floor plan of the indoor space in a Joint Photographic Experts Group (.JPEG) format or a Portable Network Graphics (.PNG) format. In other examples, however, any other form of digital representation of the floor plan can be obtained for the use of generating the map. For instance, if the floor plan can be digitally represented in a matrix format, the matrix representation can be used as the raw digital representation of the floor plan. In addition, the raw digital representation of the floor plan may or may not include georeferencing information of the various entities and/or features in the indoor space. In other words, the raw digital representation may or may not be a georeferenced with respect to various features, such as elevators, staircases, narrow hallways, shops, utilities, or lobby areas.

Further, the raw digital representation can be preprocessed before it is used for generating the map of the indoor space. The representation so obtained is referred to as a preprocessed representation. In an example, the raw digital representation can be preprocessed by either marking a region-of-interest (ROI) in the raw digital representation or classifying the indoor space into a space-category or by a combination of the two. As an example, marking the region of Interest (ROI) involves automatically selecting a portion or region of the floor plan in the raw digital representation for which the map is to be generated. For instance, floor plans, such as commercial floor plans, may contain titles, legends, and other extraneous textual or pictorial matter and logos, that are unrelated to the floor plan. The trained machine-learning model, to enhance the effectiveness and efficiency of the automatic map generation process, can be trained to select only regions of the raw digital representation which are relevant to the floor plan and its features and entities.

Further, in said example, the classification of the indoor space into the space-category can include determining the type of indoor space that the raw digital representation corresponds to. For instance, the indoor space can be classified as an office space, or a parking lot or a shopping mall or a hospital depending on the layout of the space and its features and entities identified from the raw digital representation. Alternatively or additionally, classifying the indoor space into the space-category can involve automatically classifying the floor plan, using the raw digital representation, based on its design or style, such as cartographer style or manually-generated style, CAD-generated, or navigational map style. In other implementations, the selection of the ROI can be performed manually.

Further, in another example or as an addition to the above, as part of preprocessing, all the raw digital representations, whether of a single indoor space or of different indoor spaces at different junctures, can be converted into a predefined standardized format so that the same can be further processed for generating the map.

According to an aspect, the predefined standardized format can be any representation which leads to minimum loss in the information in converting from the raw digital representation to the predefined standardized format. Accordingly, depending on the input raw digital representation, the predefined standardized format can be either rasterized representation, a vectored representation, or a binary representation of the raw digital representation. For instance, the predefined standardized format can be a JPEG, PNG, or bitmap (BMP) format. As an example, a Geospatial Data Abstraction Library (GDAL) can be used to convert various formats of the raw digital representations into a single type of predefined standardized format.

Additionally or alternatively, the format which saves the information of the raw digital representation in the most efficient manner, such as in the smallest size, upon conversion can be used as the predefined standardized format.

Further, secondary factors associated with the preprocessed representation i.e., raw digital representation which has been converted into the predefined standardized format, can also have a bearing on the selection of the predefined standardized format. For instance, the secondary factors can include the pixel resolution of the preprocessed representation, a minimum level of sharpness of the preprocessed representation, gray-scale mapping of the preprocessed representation, or a combination thereof.

In addition to the above preprocessing of the raw digital representation or as an alternate to one or more of the above, the raw digital representation may be taken through resolution enhancement, noise reduction, image augmentation or a combination thereof, as part of the preprocessing. For instance, for noise reduction, textual matter, logos or signs, or any other extraneous matter which is not part of the floor plan and which may be present in the raw digital representation is removed to increase the robustness of the technique. In a similar example, as part of image augmentation, the raw digital representation can be modified, for instance, by rotating, flipping, shifting and, adding artificial noise and blur to, to use such modifications of the raw digital representation in training the machine-learning model. In other words, by creating modified versions of the raw digital representation, the machine-learning model can be trained to improve performance and ability of the model.

Once the raw digital representation of the indoor space has been converted into the preprocessed representation, from the preprocessed representation, a skeletal map of the indoor space can be generated. The skeletal map can include various indicators that can be used to identify different element, i.e., features and entities of the indoor space. As an example, the trained machine-learning model implementing the techniques of the present subject matter can, based on the space-category that the indoor space is classified into as explained above, determine the kind of machine-learning technique to be used. For instance, the technique may be one of Convolutional Neural Network-based (CNN-based) technique, a Graph Neural Network-based (GNN-based) technique, or a Generative Adversarial Network-based (GAN-based) technique, for generating the skeletal map from the preprocessed representation.

According to an aspect, as part of generation of the skeletal map, the trained machine-learning model may apply a feature detection technique on the preprocessed representation. For instance, the feature detection technique can be either an edge detection technique or a corner detection technique or a combination thereof and can be used to identify various features and entities of the indoor space, as represented in the preprocessed representation. In addition, as an example, the skeletal map may be in a rasterized representation. In another example, the skeletal map may be in the same format as the input, i.e., the predefined standardized format.

Further, as part of the hybrid-operational technique that this present subject matter relates to, after the generation of the skeletal map, revision inputs can be received to modify one or more indicators which represent elements of the indoor space in the skeletal map. For instance, if it is determined that a wall, a staircase, an elevator, a lobby, or any such feature has been incorrectly identified by the machine-learning model from the preprocessed representation while generating the skeletal map, then the revision inputs can be used to rectify such errors. As an example, the revision inputs can be manual in nature, i.e., the skeletal map can be manually reviewed for errors and revised, such that the one or more indicators are revised in the skeletal map to one or more modified indicators. Subsequently, the modified indicators can be fed to the trained machine-learning model as training data. Such a feedback or revision mechanism integrated with the machine-learning model allows the machine-learning model to be trained using highly relevant data and, as a result, precludes the requirement of large amount of training data from various structured and unstructured sources. Accordingly, the training of the machine-learning model is not just quick, the results are substantially accurate.

Further, using the modified indicators and unmodified indicators, a modified skeletal map of the indoor space can be created and is in such a format that it is usable with a localization application for localizing a mobile device in the indoor space. In other words, the modified skeletal map is in a machine-usable format such that it can be readily integrated into indoor positioning systems or indoor navigation applications for use in localization in the indoor space.

Also provided herein in a server computing device including a processor and a memory storing a set of computer instructions. The instructions are executable in the processor for generating the map of the indoor space and then localizing a mobile device in that space using the generated map as described above.

The terms localize, or localization, as used herein refer to determining a unique coordinate position of the mobile device at a specific location along a pedestrian route being traversed relative to the indoor area or building. In some embodiments, localization may also include determining a floor within the building, and thus involve determining not only horizontal planar (x, y) coordinates, but also include a vertical, or z, coordinate of the mobile device, the latter embodying a floor number within a multi-floor building, for example. In other embodiments, the (x, y, z) coordinates may be expressed either in a local reference frame specific to the mobile device, or in accordance with a global coordinate reference frame.

One or more embodiments described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more embodiments described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some embodiments described herein can generally require the use of computing devices, including processor and memory resources. For example, one or more embodiments described herein may be implemented, in whole or in part, on computing devices such as servers, desktop computers, mobile devices including cellular or smartphones, laptop computers, wearable devices, and tablet devices. Memory, processing, and network resources may all be used in connection with the establishment, use, or performance of any embodiment described herein, including with the performance of any method or with the implementation of any system.

Furthermore, one or more embodiments described herein may be implemented through the use of instructions that are executable by one or more processors. These instructions may be carried on a computer-readable medium. Machines shown or described with figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable memory storage units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, embodiments may be implemented in the form of computer-programs, or a computer usable carrier medium capable of carrying such a program.

System Description

FIG. 1 illustrates, in an example embodiment, a system 100 for generating a map of an indoor space which can be, subsequently, used for localization inside that indoor space. In an example, the indoor space can be space enclosed or partially enclosed within a shopping mall, an airport, a warehouse, a campus building, an office space, a stadium, a hospital, a parking lot, a university campus, or any other at least partially enclosed urban infrastructure or building. The system includes a server 105 and is communicatively connected via communication network 110 to a plurality of data sources 115-1 to 115-N (collectively referred to as data sources 115 and individually referred to as data source 115). Each data source 115 can include various types and formats of floor plans of different types of indoor spaces as outlined above in structured and unstructured formats. As will be explained in detail later, the server 105 can implement machine-learning model(s) for generating the map of the indoor space. In such a scenario, the data sources 115 can provide the training data set for the machine-learning model (s) to be trained for generating the map of the indoor space. In said example, the server 105 can include a space plotter 120, which can implement the machine-learning techniques for generating the map of the indoor space. For instance, the machine-learning techniques may include deep-learning techniques and may be executed by a Convolutional Neural Network-based (CNN-based) model, a Graph Neural Network-based (GNN-based) model, or a Generative Adversarial Network-based (GAN-based) model, which can be integrated into the space plotter 120.

In operation, as an example, the server 105 can implement a hybridized manner of combining mechanized generation of the map of the floor plan with manual intervention to ensure that the map so generated is accurate and substantially devoid of errors. The server 105 can obtain one or more raw digital representations of the indoor space. In an example, the raw digital representation can be a digital drawing or floor plan of the indoor space in a vectored or rasterized format, for instance, prepared by an architect using a drawing tool. As an example, the raw digital representation can be a CAD drawing of the floor plan of the indoor space in a Joint Photographic Experts Group (.JPEG) format or a Portable Network Graphics (.PNG) format. In addition, the raw digital representation may or may not be a georeferenced with respect to various features, such as elevators, staircases, narrow hallways, shops, utilities, or lobby areas.

Further, the server 105 can preprocess the raw digital representation before it is used for generating the map of the indoor space. The representation so obtained is referred to as a preprocessed representation. In an example, the server 105 can preprocess the raw digital representation by marking a region-of-interest (ROI) in the raw digital representation and classifying the indoor space into a space-category or even by performing either one of the two. As an example, the server 105 can automatically select a portion or region of the floor plan in the raw digital representation for which the map is to be generated. In addition, as mentioned previously, the server 105 can classify the indoor space into a space-category by determining the type of indoor space that the raw digital representation corresponds to. For instance, the server 105 can classify the indoor space as an office space, or a parking lot or a shopping mall or a hospital depending on the layout of the space and its features and entities identified from the raw digital representation. In another example or in addition the above example, the server 105 can, as part of classifying, also classify or associate with the floor plan, using the raw digital representation, a design or style, such as cartographer/manually-generated style, CAD-generated, or navigational map style, of the floor plan.

Further, the server 105 may also, as part of preprocessing, convert all the raw digital representations whether of a single indoor space or of different indoor spaces at different junctures, into a predefined standardized format so that the same can be further processed for generating the map. The predefined standardized format can be any representation which leads to minimum loss in the information in converting from the raw digital representation to the predefined standardized format or can be a format which saves the information of the raw digital representation in the most efficient manner, such as in the smallest size, upon conversion.

Once the server 105 has obtained the preprocessed representation by converting the raw digital representation of the indoor space, the server 105 can use the preprocessed representation to generate a skeletal map of the indoor space. The skeletal map can depict only thread-bare elements in the indoor space and is in such a format that it is a machine-usable format and such that it can be readily integrated into indoor positioning systems or indoor navigation applications for use in localization in the indoor space. In said example, the skeletal map can include various indicators that the server 105 can use to identify different element, i.e., features and entities, of the indoor space. As an example, the server 105 can use the trained machine-learning model for generating the skeletal map. Further, according to an aspect, the server 101 may selectively apply different machine learning techniques for different scenarios to generate the skeletal map. For instance, the server 105 can select the machine-learning technique to be employed based on the space-category that the indoor space is classified into, as explained above. As explained above, the server 105 may employ one of the Convolutional Neural Network-based (CNN-based) technique, the Graph Neural Network-based (GNN-based) technique, or the Generative Adversarial Network-based (GAN-based) technique, for generating the skeletal map from the preprocessed representation.

Subsequent to the generation of the skeletal map, the server 105 can receive and record revision inputs to modify one or more indicators in the skeletal map which represent elements of the indoor space. For instance, if it is determined that a wall, a staircase, an elevator, a lobby, or any such feature has been incorrectly identified by the machine-learning model from the preprocessed representation while generating the skeletal map, then the revision inputs can be used to rectify such errors. As an example, the revision inputs can be manual in nature, i.e., the skeletal map can be manually reviewed for errors and revised, and the server 105 can receive the manual inputs to revise an indicator in the skeletal map. Such an indicator which has been revised on the basis of the revision inputs is referred to as a modified indicator. According to an aspect, the server 105 can use the modified indicators for re-training the machine-learning model implemented thereby. Using the modified indicators and unmodified indicators, the server 105 can create a modified skeletal map of the indoor space which is in the same format as the skeletal map, i.e., it can be readily deployed with an indoor positioning system owing to being machine-usable.

Figure 2:
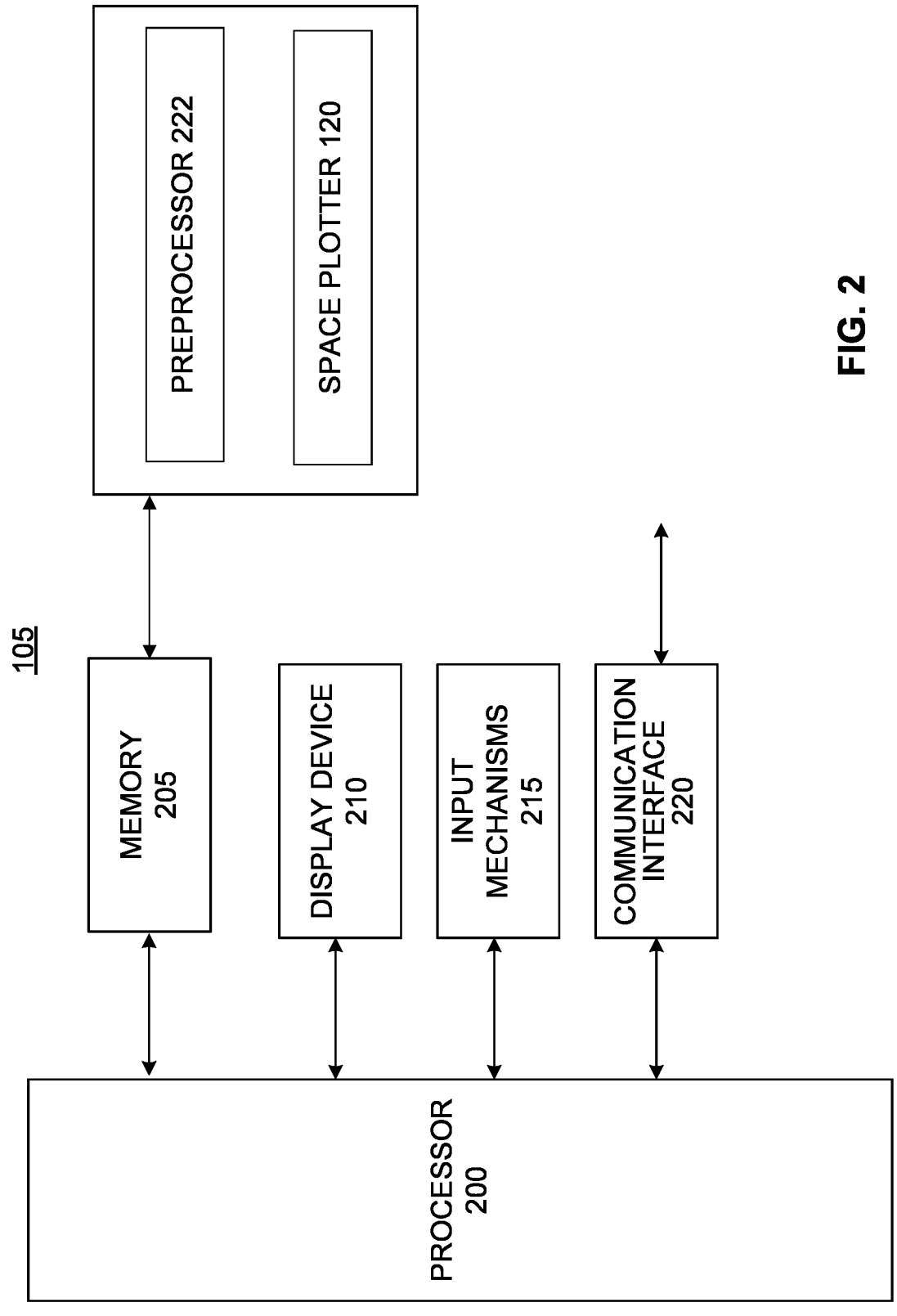
FIG. 2 illustrates, as an example, an architecture of a computing device automatically generating a map of an indoor space.

FIG. 2 illustrates an example architecture of the server computing device 105, referred to as the server 105, for generating a map of the indoor space. The server 105, in an embodiment architecture, may be implemented on one or more server devices, and includes processor 200, memory 205 which may include a read-only memory (ROM) as well as a random-access memory (RAM) or other dynamic storage device, display device 210, input mechanisms 215 and communication interface 220 for communicative coupling to communication network 104. Processor 200 is configured with software and/or other logic (such as from a trusted GPS logic module) to perform one or more processes, steps and other functions described with implementations, such as described by FIGS. 1 through 4 herein. Processor 200 may process information and instructions stored in memory 205, such as provided by a random-access memory (RAM) or other dynamic storage device, for storing information and instructions which are executable by processor 200. Memory 205 also may be used for storing temporary variables or other intermediate information during execution of instructions to be executed by processor 200. Memory 205 may also include the ROM or other static storage device for storing static information and instructions for processor 200; a storage device, such as a magnetic disk or optical disk, may be provided for storing information and instructions. Communication interface 220 enables server 101 to communicate with one or more communication networks 104 (e.g., cellular network) through use of the network link (wireless or wired). Using the network link, server 101 can communicate with data recording devices 102.

The server 101 may include instructions stored in RAM of memory 205, and includes a preprocessor 222 in addition to the space plotter 120.

As explained above, the server 105 can generate the map for the indoor space by employing a trained machine-learning model, such as a trained deep-learning model, and the preprocessor 222 and the space plotter 120 may individually or collectively implement the trained machine learning model. For instance, the machine-learning model may be a Convolutional Neural Network-based (CNN-based) model, a Graph Neural Network-based (GNN-based) model, or a Generative Adversarial Network-based (GAN-based) model.

The preprocessor 222 can, first, obtain one or more raw digital representations of the indoor space. As an example, the preprocessor 222 may receive one or more raw digital representations as input at the server 105 for the purposes of generating the map of the indoor space. For instance, the server 105 can be connected, directly or over the communication network 104, to an indoor positioning system (not shown) which can send the raw digital representations of an indoor space along with a request to the server 105 to generate the map of that indoor space that the indoor positioning system wants to service.

In an example, the raw digital representation can be a digital drawing or floor plan of the indoor space in a vectored or rasterized format, for instance, prepared by an architect using a drawing tool. As an example, the raw digital representation can be a CAD drawing of the floor plan of the indoor space in a Joint Photographic Experts Group (.JPEG) format or a Portable Network Graphics (.PNG) format. In other examples, however, the preprocessor 202 can obtain and use any other form of digital representation of the floor plan for the purpose of generating the map. For instance, if the floor plan can be digitally represented in a matrix format, the preprocessor 222 can use the matrix representation as the raw digital representation of the floor plan. In addition, the raw digital representation of the floor plan may or may not include georeferencing information of the various entities and/or features in the indoor space, such as elevators, staircases, narrow hallways, shops, utilities, or lobby areas.

Further, the preprocessor 222 can preprocess the raw digital representation and obtain a preprocessed representation before using it for generating the map of the indoor space and. In an example, the preprocessor 222 can preprocess the raw digital representation by marking a region-of-interest (ROI) in the raw digital representation or classifying the indoor space into a space-category or by a doing both. As an example, the preprocessor 222 can, as part of marking the region of Interest (ROI), automatically select a portion or region of the floor plan in the raw digital representation for which the map is to be generated. In said example, the trained machine learning model implemented in the preprocessor 222 can automatically mark the ROI in the raw digital representation. For instance, the trained machine-learning model, to enhance, the effectiveness and efficiency of the map generation process, can be trained to select only regions of the raw digital representation which are relevant to the floor plan and its features and entities and ignore titles, legends, and other extraneous textual or pictorial matter and logos, that are unrelated to the floor plan.

Further, the preprocessor 222 can, as part of preprocessing, classify the indoor space into the space-category by determining the type of indoor space that the raw digital representation corresponds to. For instance, the preprocessor 222 can identify the indoor space as an office space, or a parking lot or a shopping mall or a hospital by implementing the machine learning model which determines the layout of the space and its features and entities identified from the raw digital representation. In another example, as part of classifying the indoor space into the space-category, the preprocessor 222 can involve automatically classifying the floor plan based on a design or style, by applying the machine learning techniques on the raw digital representation. For instance, the preprocessor 1222 classify the floor plan into a cartographer style, i.e., manually-generated, CAD-generated, or navigational-style map.

Further, in another example or as an addition to the above, as part of preprocessing, the preprocessor 222 can convert the raw digital representation into a predefined standardized format so that the same can be further processed for generating the map. According to an aspect, the predefined standardized format can be any representation which leads to minimum loss in the information in converting from the raw digital representation to the predefined standardized format. Accordingly, depending on the input raw digital representation, the predefined standardized format can be either rasterized representation, a vectored representation, or a binary representation of the raw digital representation. For instance, the predefined standardized format can be a JPEG, PNG, or bitmap (BMP) format. As an example, the preprocessor 222 can implement a Geospatial Data Abstraction Library (GDAL) to convert various formats of the raw digital representations into a single type of predefined standardized format. Additionally or alternatively, as part of conversion to the predefined standard representation, the preprocessor 222 may convert the raw digital representation into the format which saves the information of the raw digital representation in the most efficient manner, such as in the smallest size, upon conversion can be used as the predefined standardized format.

Further, the preprocessor 222 may consider secondary factors associated with the preprocessed representation i.e., raw digital representation which has been converted into the predefined standardized format, for selecting the predefined standardized format. For instance, the secondary factors can include the pixel resolution of the preprocessed representation, a minimum level of sharpness of the preprocessed representation, gray-scale mapping of the preprocessed representation, or a combination thereof.

In addition to the above preprocessing of the raw digital representation or as an alternate to one or more of the above, the preprocessor 222 may implement other processing techniques including resolution enhancement, noise reduction, image augmentation or a combination thereof, as part of the preprocessing. For instance, for noise reduction, the preprocessor 222 can, using machine learning techniques, remove the textual matter, logos or signs, or any other extraneous matter which is not part of the floor plan but is present in the raw digital representation to increase the robustness of the technique. In a similar example, as part of image augmentation, the preprocessor 222 modify the raw digital representation, for instance, by rotating, flipping, shifting and, adding artificial noise and blur to, such that the modified digital representation is usable in training the machine-learning model that the preprocessor implements.

Once the raw digital representation of the indoor space has been converted into the preprocessed representation, from the preprocessed representation, the space plotter 120 can generate a skeletal map of the indoor space. The skeletal map can include various indicators that can be used to identify different element, i.e., features and entities of the indoor space. For instance, space plotter 120 can generate the skeletal map to include a first indicator that is a thick line to indicate a wall and a second indicator which is a thin line to indicate an opening, such as a door, in the wall. Similarly, the distance between walls can be used to indicate a passage or a lobby. On the same lines, the space plotter 120 can use a series of closely spaced parallel lines to indicate a staircase in the skeletal map.

In one example, the space plotter 120 may selectively apply different machine learning techniques for different scenarios to generate the skeletal map. For instance, the space plotter 120 an select the machine-learning technique to be employed based on the space-category that the indoor space is classified into, as explained above. As explained above, the server 105 may employ one of the Convolutional Neural Network-based (CNN-based) technique, the Graph Neural Network-based (GNN-based) technique, or the Generative Adversarial Network-based (GAN-based) technique, for generating the skeletal map from the preprocessed representation.

According to an aspect, for generation of the skeletal map, the space plotter 120 can employ the trained machine-learning model to implement a feature detection technique on the preprocessed representation. For instance, as part of the feature detection technique, the space plotter 120 can apply either an edge detection technique or a corner detection technique or a combination thereof and, based thereon, identify various features and entities of the indoor space, as represented in the preprocessed representation. In addition, as an example, the space plotter 120 can generate the skeletal map in a rasterized representation. In another example, the space plotter 120 can generate the skeletal map in the same format as the input, i.e., the predefined standardized format.

Further, as part of the hybrid-operational technique that this present subject matter relates to, after the generation of the skeletal map, the space plotter 120 can receive revision inputs to modify an indicator which represents an element of the indoor space in the skeletal map. In other words, if a wall, a staircase, an elevator, a lobby, or any such feature has been incorrectly identified by the space plotter 120 while generating the skeletal map, then the revision inputs can be used to rectify such errors. For instance, if the original floor plan, i.e., the raw digital representation, indicates that a wall has a door, but the skeletal map shows a continuous thick line in the same place, then it is evident that the skeletal map has that error. Accordingly, the space plotter 102 can receive manual revision inputs, i.e., the skeletal map can be manually reviewed for errors and revised, such that the erroneous indicator is revised in the skeletal map to a modified indicator. For the purposes of effectively and quickly training the machine-learning model, the modified indicator is provided as training data to the machine learning model.

Further, using the modified indicators and unmodified indicators, the space plotter 120 can generate the modified skeletal map of the indoor space. As explained above, the modified skeletal map is in such a format that it is usable with a localization application for localizing a mobile device in the indoor space. In other words, the modified skeletal map is in a machine-usable format such that it can be readily integrated into indoor positioning systems or indoor navigation applications for use in localization in the indoor space. In other examples, the space plotter 120 may convert the modified skeletal map into a format that is readily implementable in the indoor position system. For instance, the space plotter 120 may convert the rasterized representation of the modified skeletal map, as described in an example above, into a vectored representation, which can be usable for localization. In another example, however, the skeletal map first generated by the space plotter 120 as a rasterized representation can be converted into the vectorized representation and space plotter 120 can generated the modified skeletal map in a vectorized format from the vectorized representation of the skeletal map.

For localization, the space plotter 120 may georeference the map of the indoor space, in case, the raw digital representation did not include georeferencing information. On the other hand, if the raw digital representation is georeferenced, the space plotter 120 may not have to separately georeference the various physical entities in the indoor space. The georeference, as understood, may be any information which can be used to indicate the location of the physical entity. In one example, as part of georeferencing, global or absolute coordinates are used to indicate the location of the physical entities. In other examples, a local coordinate system, for instance, associated with the indoor space, may be used for georeferencing the physical entities.

Such cross-referencing between the physical entities in the indoor space overlaid with a fingerprint map of the indoor space can be used for generating a grid map of the indoor space and can be used for, amongst other things, localization of a mobile device in the indoor space. As an example, the grid map can be a representation of the indoor space, for instance, of the floor plan of the indoor space, in terms of hierarchically arranged polygonal tiles forming a tessellated grid structure. The other associated aspects regarding fingerprint map generation and calibration for localization are not discussed herein in detail, but can be implemented along with the aspects of the present subject matter for the purposes of localization.

In an example, the server 105 may include a fingerprint repository (not shown in figures) having the fingerprint map and which may be communicatively accessible to mobile devices, via the network, for localization. For instance, once the indoor space is calibrated, the various locations or physical entities identified in the map of the indoor space can be georeferenced with any information which can be used to indicate the location of the physical entity in the indoor space.

The terms fingerprint map, fingerprint data, and/or fingerprint repository as used herein refer to time-correlated or time-stamped, individual measurements of any of, or any combination of, received wireless communication signal strength and signal connectivity parameters, magnetic field measurements and barometric pressure measurements, and mobile device inertial sensor data at known, particular locations within an area being traversed, or anticipated for traversal, by the mobile device. In other words, a fingerprint includes a correlation of sensor and signal information including, but not necessarily limited to wireless signal strength, magnetic and barometric data, and inertial sensor information time-correlated for respective positions or coordinate locations within the area or facility being traversed. For instance, barometric fingerprint data associated with contiguous locations or positions may establish a pattern or signature that uniquely correlates to that particular sequence of locations or positions. A sequence of positions or locations that constitute a navigation path traversed by the mobile device relative to a given indoor facility may be fingerprint-mapped during calibration, and the resulting fingerprint map stored in the fingerprint data repository of the server 105. Once a particular as-measured value, a pattern or signature based on any one or more of received wireless communication signal strength and signal connectivity parameters, magnetic field parameters or barometric pressure parameters, and mobile device inertial sensor data is detected or recorded by the mobile device, the value or pattern as detected may be matched to a reference fingerprint stored in a fingerprint map of a given facility, for example as stored in positioning fingerprint repository, to identify the unique position of the mobile device relative to the facility, a process also referred to herein as localization.

Methodology

FIG. 3 illustrates, as an example, a method for generating a map of an indoor space. In describing FIG. 3, reference to the description and examples of FIGS. 1-2 should be understood to be part thereof for purposes of illustrating suitable components or elements for performing a step or sub-step being described and for the sake of brevity, the detailed operation of the components or elements has not been repeated herein and will be understood to be associated with the respective step or sub-step being described.

It will be appreciated that some of the method steps may be deleted, modified, or more steps may be added. Also, the steps are not limited by the order in which they are performed. Some of the steps may be performed simultaneously as well.

Referring to FIG. 3 examples of method steps described herein are techniques are performed by the processor 200 executing one or more sequences of software logic instructions that constitute the space plotter 120 and the preprocessor 222 of the server 105. In embodiments, the space plotter 120 and the preprocessor 222 may include the one or more sequences of instructions within sub-modules. Such instructions may be read into the memory 205 from machine-readable medium, such as memory storage devices. Execution of the sequences of instructions contained in the space plotter 120 and the preprocessor 222 in the memory 205 causes the processor 200 to perform the process steps described herein. It is contemplated that, in some implementations, some of the sub-modules, or any other portions of executable instructions constituting the component the space plotter 120 and the preprocessor 222 may be hosted at a remote device. In alternative implementations, at least some hard-wired circuitry may be used in place of, or in combination with, the software logic instructions to implement examples described herein. Thus, the examples described herein are not limited to any particular combination of hardware circuitry and software instructions.

At block 310, one or more raw digital representations of the indoor space are obtained. In an example, the raw digital representation can be a digital drawing or floor plan of the indoor space in a vectored or rasterized format, for instance, prepared by an architect using a drawing tool. As an example, the raw digital representation can be a CAD drawing of the floor plan of the indoor space in a Joint Photographic Experts Group (.JPEG) format or a Portable Network Graphics (.PNG) format. In other examples, however, any other form of digital representation of the floor plan can be obtained for the use of generating the map. For instance, if the floor plan can be digitally represented in a matrix format, the matrix representation can be used as the raw digital representation of the floor plan. In addition, the raw digital representation of the floor plan may or may not include georeferencing information of the various entities and/or features in the indoor space. In other words, the raw digital representation may or may not be a georeferenced with respect to various features, such as elevators, staircases, narrow hallways, shops, utilities, or lobby areas.

At block 320, the raw digital representation can be preprocessed to obtain a preprocessed representation before it is used for generating the map of the indoor space. In an example, the raw digital representation can be preprocessed by either marking a region-of-interest (ROI) in the raw digital representation or by classifying the indoor space into a space-category, or both. As an example, marking the region of Interest (ROI) involves automatically selecting a portion or region of the floor plan in the raw digital representation for which the map is to be generated. Further, in said example, the classification of the indoor space into the space-category can include determining the type of indoor space that the raw digital representation corresponds to.

Further, in another example or as an addition to the above, as part of preprocessing, all the raw digital representations, whether of a single indoor space or of different indoor spaces at different junctures, can be converted into a predefined standardized format so that the same can be further processed for generating the map. According to an aspect, the predefined standardized format can be any representation which leads to minimum loss in the information in converting from the raw digital representation to the predefined standardized format. In another example or the same as the previous one, the format which saves the information of the raw digital representation in the most efficient manner, such as in the smallest size, upon conversion can be used as the predefined standardized format. Further, secondary factors associated with the preprocessed representation, i.e., raw digital representation which has been converted into the predefined standardized format, can also have a bearing on the selection of the predefined standardized format. For instance, the secondary factors can include the pixel resolution of the preprocessed representation, a minimum level of sharpness of the preprocessed representation, gray-scale mapping of the preprocessed representation, or a combination thereof.

Once the raw digital representation of the indoor space has been converted into the preprocessed representation, at block 330, a skeletal map of the indoor space can be generated using the preprocessed representation. The skeletal map can include various indicators that can be used to identify different element, i.e., features and entities of the indoor space.

Further, at block 340, after the generation of the skeletal map, revision inputs can be received to modify one or more indicators, for instance, which have an error in representing elements of the indoor space in the skeletal map. As an example, the revision inputs can be manual in nature, i.e., the skeletal map can be manually reviewed for errors and revised, such that the one or more indicators are revised in the skeletal map to one or more modified indicators. Subsequently, at block 450, using the modified indicators and unmodified indicators, a modified skeletal map of the indoor space can be created and is in such a format that it is usable with a localization application for localizing a mobile device in the indoor space.

It is contemplated for embodiments described herein to extend to individual elements and concepts described herein, independently of other concepts, ideas or system, as well as for embodiments to include combinations of elements recited anywhere in this application. Although embodiments are described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mention of the particular feature. Thus, the absence of describing combinations should not preclude the inventor from claiming rights to such combinations.

What is claimed is:

1. A method of automatically generating a map of an indoor space, the method comprising:
   obtaining a raw digital representation of the indoor space;
   preprocessing the raw digital representation to obtain a preprocessed representation by:
      marking a region-of-interest (ROI) in the raw digital representation, the marking includes:
         identifying extraneous matter in the raw digital representation, the extraneous matter comprising matter not relevant to a floor plan of the indoor space;
         discarding the extraneous matter to select a portion of the floor plan in the raw digital representation; and
         identifying a space-category of the indoor space based on a layout of the indoor space and identification of entities of the indoor space from the raw digital representation to classify the indoor space into the space category;
   generating, from the preprocessed representation, a skeletal map of the indoor space comprising a plurality of indicators each to identify a structural element of the indoor space;
   overlaying the skeletal map having georeferenced plurality of indicators with a fingerprint map for generating a map for the indoor space, the fingerprint map comprising a correlation of sensor and signal information for a sequence of positions that constitute a navigation path traversed by a mobile device relative to the indoor space;
   receiving revision inputs to correct an incorrectly identified indicator from amongst the plurality of indicators, wherein the indicator is revised to a modified indicator; and
   creating a modified skeletal map of the indoor space comprising the modified indicator and unmodified indicators, wherein the modified skeletal map is usable with a localization application for localizing the mobile device in the indoor space.

2. The method of claim 1, executed by a trained machine-learning model.

3. The method of claim 2, wherein the trained machine-learning model is a trained deep-learning model.

4. The method of claim 2, wherein the modified indicator is fed to the trained machine-learning model as training data.

5. The method of claim 1, wherein the raw digital representation is one of a georeferenced vectored representation, a georeferenced rasterized representation, a non-georeferenced vectored representation, and non-a georeferenced rasterized representation.

6. The method of claim 1, wherein the preprocessing comprises converting the raw digital representation into a predefined standardized format.

7. The method of claim 1, wherein the preprocessing comprises performing at least one of resolution enhancement, noise reduction, and image augmentation on the raw digital representation.

8. The method of claim 1, wherein the generating comprises applying a feature detection technique, the feature detection technique comprising at least one of an edge detection technique and a corner detection technique.

9. The method of claim 1, wherein the skeletal map is in a rasterized representation.

10. The method of claim 9, wherein the creating comprises converting the rasterized representation into a vectored representation.

11. A server computing device for automatically generating a map of an indoor space, the server computing device comprising:
   a processor; and
   a memory storing a set of instructions, the instructions executable in the processor to:
      obtain a raw digital representation of the indoor space;
      preprocess the raw digital representation to obtain a preprocessed representation by:
         marking a region-of-interest (ROI) in the raw digital representation, the marking includes:
            identifying extraneous matter in the raw digital representation, the extraneous matter comprising matter not relevant to a floor plan of the indoor space;
            discarding the extraneous matter to select a portion of the floor plan in the raw digital representation; and
            identifying into a space-category of the indoor space based on a layout of the indoor space and identification of entities of the indoor space from the raw digital representation to classify the indoor space into the space category;
      generate, from the preprocessed representation, a skeletal map of the indoor space comprising a plurality of indicators each to identify a structural element of the indoor space;
      overlay the skeletal map having georeferenced plurality of indicators with a fingerprint map for generating a map for the indoor space, the fingerprint map comprising a correlation of sensor and signal information for a sequence of positions that constitute a navigation path traversed by a mobile device relative to the indoor space;
      receive revision inputs to correct an incorrectly identified indicator from amongst the plurality of indicators, wherein the indicator is revised to a modified indicator; and
      create a modified skeletal map of the indoor space comprising the modified indicator and unmodified indicators, wherein the modified skeletal map is usable with a localization application for localizing a mobile device in the indoor space.

12. The server computing device of claim 11 implementing a trained machine-learning model.

13. The server computing device of claim 12 further comprising instructions to feed the modified indicator to the trained machine-learning model as training data.

14. The server computing device of claim 12, wherein the trained machine-learning model is a trained deep-learning model.

15. The server computing device of claim 11, wherein the raw digital representation is one of a georeferenced vectored representation, a georeferenced rasterized representation, a non-georeferenced vectored representation, and non-a georeferenced rasterized representation.

16. The server computing device of claim 11 further comprising instructions to convert the raw digital representation into a pre-defined standardized format.

17. The server computing device of claim 11 further comprising instructions to perform at least one of resolution enhancement, noise reduction, and image augmentation on the raw digital representation.

18. The server computing device of claim 11 further comprising instructions to apply a feature detection technique, the feature detection technique comprising at least one of an edge detection technique and a corner detection technique.

19. The server computing device of claim 11, wherein the skeletal map is in a rasterized representation.

20. The server computing device of claim 19, further comprising instructions to convert the rasterized representation into a vectored representation.

*     *     *     *     *